United States Patent [19]

Bagley

[11] Patent Number: 4,965,424

[45] Date of Patent: Oct. 23, 1990

[54] DISPOSABLE FOOD CONTAINER FOR MICROWAVE OVENS

[75] Inventor: Bruce Bagley, Fort Pierce, Fla.

[73] Assignee: Mass Market Sales, Inc., Fort Pierce, Fla.

[21] Appl. No.: 357,337

[22] Filed: May 25, 1989

[51] Int. Cl.$^5$ .............................................. H05B 6/80
[52] U.S. Cl. ........................ 219/10.55 E; 99/DIG. 14; 426/107; 426/234; 426/243; 229/198.3; 229/903
[58] Field of Search ................. 219/10.55 E, 10.55 F, 219/10.55 R; 426/107, 234, 243, 241, 109, 112, 113; 99/DIG. 14; 206/9; 229/6 R, 16 R, 902, 903, 906, 198.2, 198.3

[56] References Cited

U.S. PATENT DOCUMENTS

| | | | |
|---|---|---|---|
| 1,163,684 | 12/1915 | Palmer | 229/6 R |
| 2,257,057 | 9/1941 | Huye | 206/9 |
| 2,556,638 | 6/1951 | Wickersham | 229/6 R |
| 2,618,937 | 11/1952 | Francis | 229/6 R |
| 2,784,895 | 3/1957 | Linwood, Jr. et al. | 229/906 X |
| 2,807,401 | 9/1957 | Smith | 229/6 R |
| 3,861,576 | 1/1975 | Tolaas et al. | 426/113 X |
| 4,065,583 | 12/1977 | Ahlgren | 426/107 X |
| 4,632,302 | 12/1986 | Manizza | 229/903 X |
| 4,644,858 | 2/1987 | Liotto et al. | 219/10.55 E X |

FOREIGN PATENT DOCUMENTS 19694 of 1908 United Kingdom ................... 206/9

Primary Examiner—Philip H. Leung
Attorney, Agent, or Firm—Eckert Seamans Cherin & Mellott

[57] ABSTRACT

A disposable food container that is particularly suited for microwave ovens includes a base and at least one upright container wall. The container wall forms with the base an open-topped food container for eggs and other foods, which can be placed into a microwave oven for cooking the food. The container wall is separately attachable to the base. The base and container wall can intially be provided as a single card, where serrations or other suitable structure permit the separation of the card into base and container wall portions. Tabs can be provided in the container wall to engage slots provided in the base, and can be folded under the base to attach the container wall to the base. Interlocking structure can be provided at the free ends of the container wall to secure these ends together and to thereby form with the base a closed-perimeter container for the food.

14 Claims, 3 Drawing Sheets

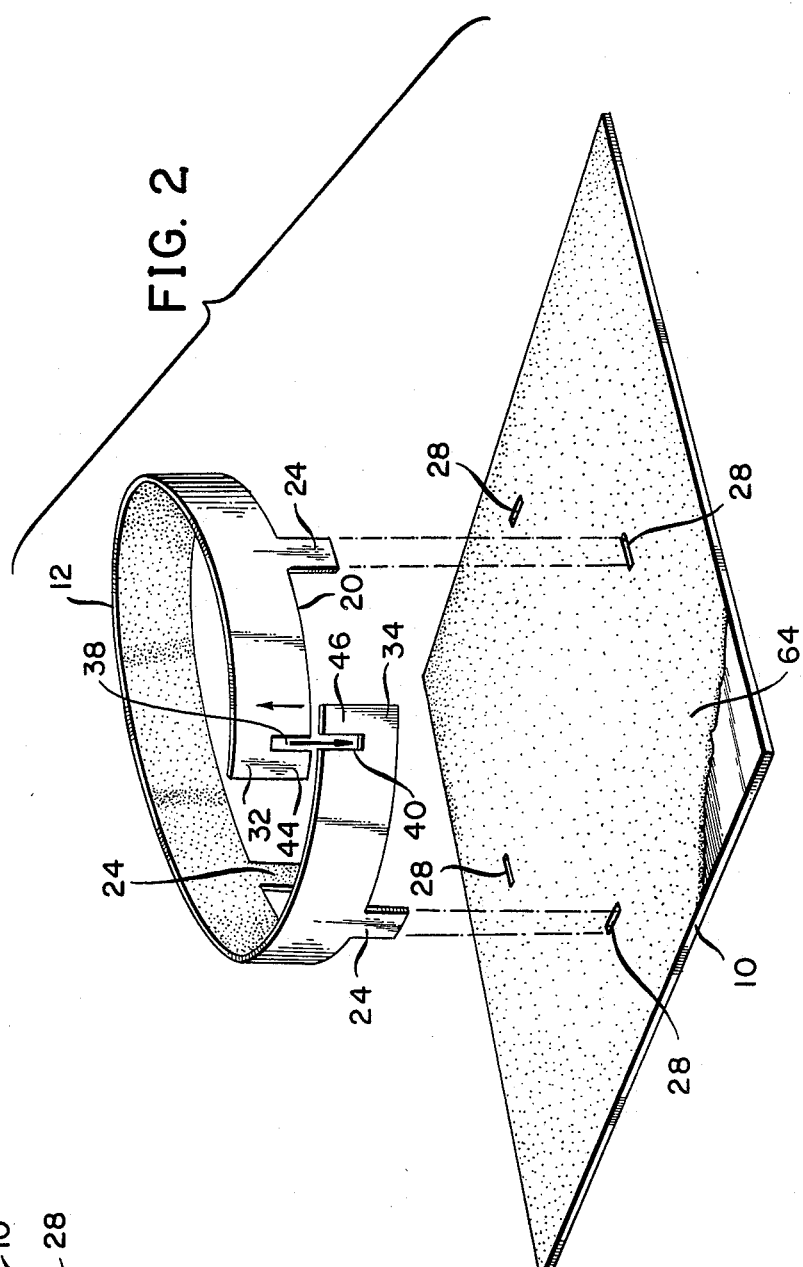
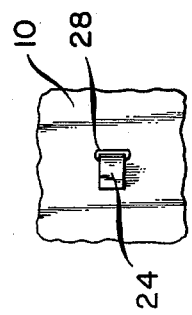

DISPOSABLE FOOD CONTAINER FOR MICROWAVE OVENS

BACKGROUND OF THE INVENTION

1. Field of the Invention

This invention relates generally to food containers, and more particularly to disposable food containers for microwave ovens.

2. Description of the Prior Art

Microwave cooking is popular as a quick and convenient method of preparing foods. Many foods are currently available in packages which can be placed directly into the microwave oven such that the food can be conveniently cooked in, and sometimes consumed from, the package. These packages are usually disposable, and the food may therefore be quickly prepared and consumed without using dishes.

Fresh foods, and particularly eggs, are not readily amenable to disposable, microwavable packages. It would therefore be desirable to provide a disposable, microwavable container which is useful to prepare these and other foods. It further would be desirable if such a container can be conveniently stored prior to use, is not expensive, and is adaptable to cook single servings of food.

Summary of the Invention

It is an object of the invention to provide a disposable food container.

It is another object of the invention to provide a food container that is suitable for use in microwave ovens.

It is still another object of the invention to provide a food container which can be conveniently stored prior to use.

It is yet another object of the invention to provide a food container which is inexpensive.

It is still another object of the invention to provide a food container that can be used to cook single servings of food.

These and other objects are accomplished by a food container having a base and at least one upstanding container wall. The container wall forms, with the base, an open-topped container for the food. The container wall is preferably an elongated strip of material that is attached on a side edge thereof to the base in a closed-perimeter, upright configuration just prior to use. Fastening structure is provided for attaching the container wall to the base. End attachment structure can be provided to secure free ends of the container wall to one another to close the perimeter of the container, which is especially desirable when cooking flowable foods such as raw eggs.

In a most preferred embodiment, the container wall and base are initially provided in one or more cards. Serrations, scribe cuts or other suitable means are provided for detachment of the base and container wall from the card. The container wall can be defined at a side edge of the card by a serration that is used to separate the container wall from the card. Another portion of the card forms the base, which also can be defined by serrations used to separate the base from the card. Additional serrations can be provided to form additional containers from a single card.

Tabs are preferably formed in the container wall for attaching the container wall to the base. The tabs are spaced apart along the length of a long side edge of the container wall. Slots are provided in the base at intervals corresponding to the separation of the tabs, and are adapted to permit insertion of the tabs through the base. The tabs can then be folded under the base to secure the container wall to the base in an upright configuration. The slots are preferably arranged such that ends or other portions of the container wall meet to form a closed-perimeter wall for the container.

The container wall can be attached to the base in a number of closed-perimeter orientations, such as circles or squares. A circular configuration is preferred for aesthetic reasons when the container is to be used for eggs. A single container wall that closes on itself to form the sides of the container is presently preferred, although alternatively several container wall portions could be linked together to complete the wall of a container.

Free ends of the container wall are attached to one another to provide a secure, closed-perimeter container for the food. This is especially desirable where the container is to be used for cooking flowable foods such as eggs. End attachment means can be conveniently provided as oppositely-oriented channels which form interlocking tabs at free ends of the container wall.

The container of the invention can be formed from several suitable materials. The material should be substantially rigid, non-toxic, and relatively inexpensive. The material should be pliable to allow for configuring and attaching the container wall, and frangible if the container wall must be separated from a card. Cardboard is a presently preferred material, and can be covered with a suitable non-stick coating such as beeswax to prevent adhesion of the food to the container.

BRIEF DESCRIPTION OF THE DRAWINGS

There are shown in the drawings embodiments which are presently preferred, it being understood, however, that the invention is not limited to the precise arrangements and instrumentalities shown, wherein:

FIG. 2 is an exploded perspective of a food container according to the invention.

FIG. 3 is a bottom view of a portion of a food container according to the invention.

DETAILED DESCRIPTION OF THE PREFERRED EMBODIMENTS

Figure 1:
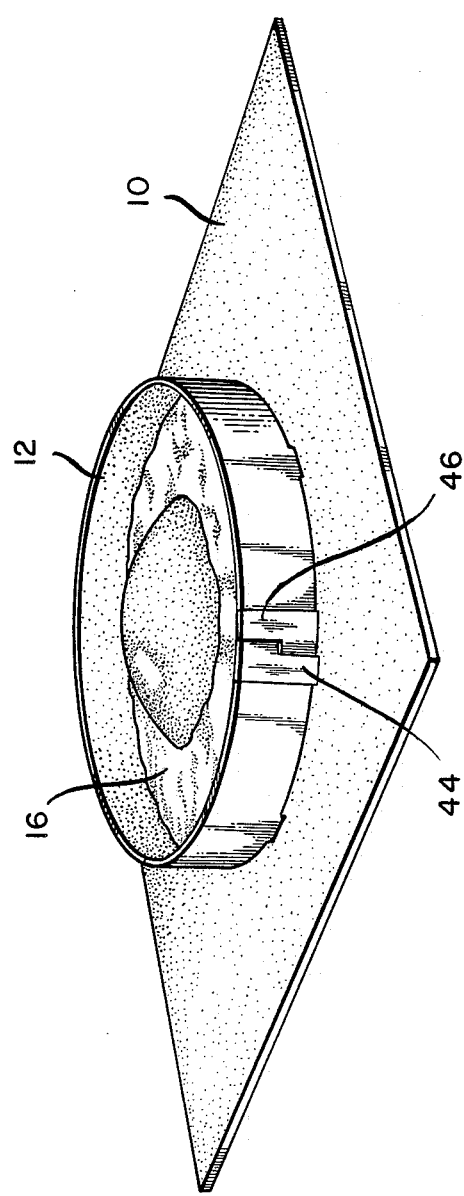
FIG. 1 is a perspective view of a food container according to the invention as used to cook an egg.
Figure 4:
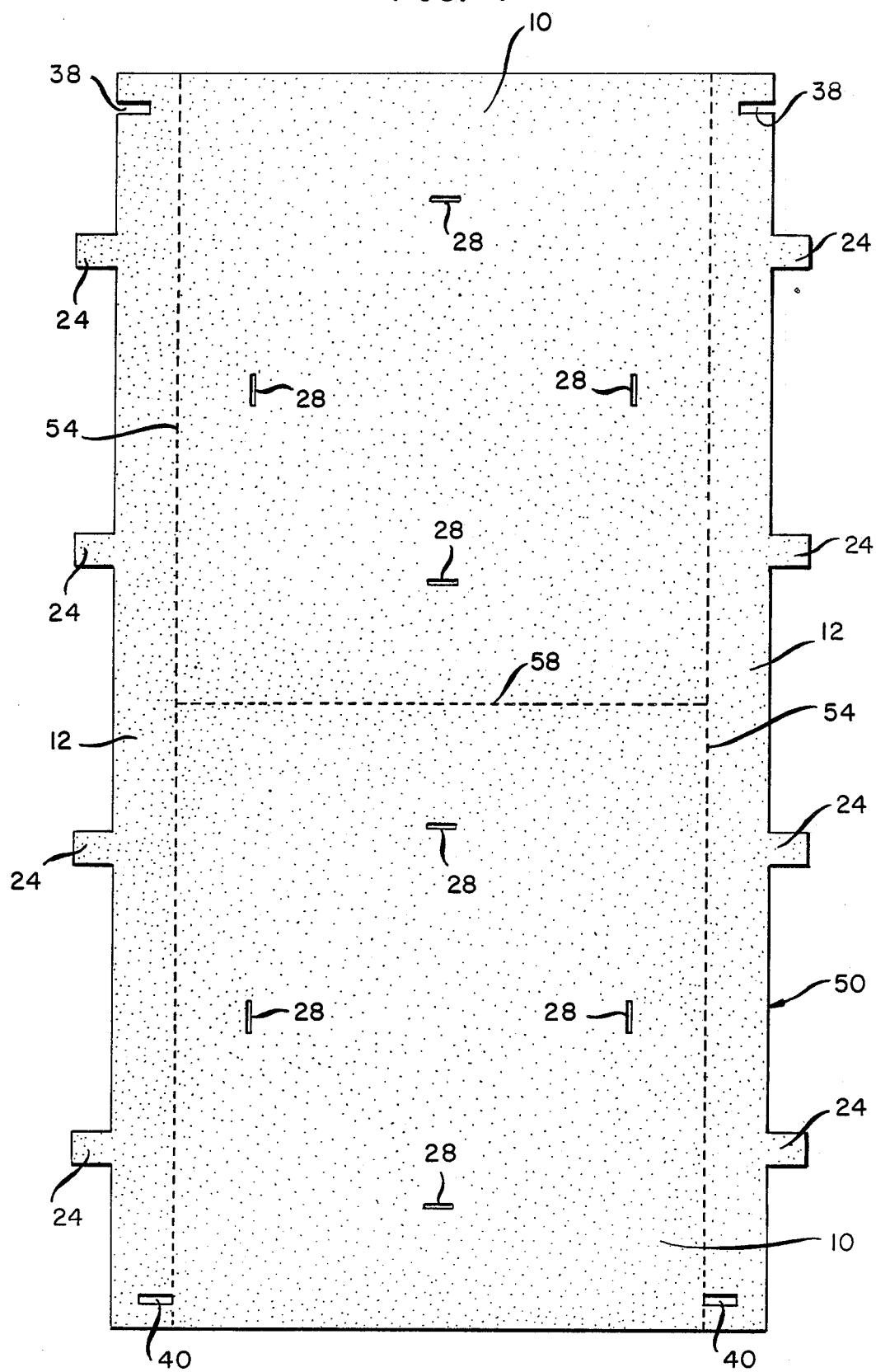
FIG. 4 is a plan view of a card used to form the food container of the invention.

A container according to the invention is shown in FIG. 1. The container includes a base 10 and an upstanding container wall 12. The container wall 12 is preferably fixed to the base 10 in a closed-perimeter, substantially perpendicular configuration. Flowable materials, such as the egg 16, can then be contained within the open-topped container formed by the base 10 and the container wall 12, and can be placed within a microwave oven to quickly cook the food. The food can be consumed directly from the container, or can be placed onto a separate serving dish.

The container wall 12 can be attached to the base 10 in several alternative configurations. A circular configuration is particularly desirable for aesthetic reasons when cooking eggs, as this is the familiar configuration of an egg when it has been cooked on a grill or skillet. Alternative configurations, including square configurations, are also possible.

The container wall 12 preferably is initially separate to the base 10 so that the components of the container will be essentially flat and can be easily stored. The container wall 12 can be formed by one or more elongated, flat strips of material. The container wall strip can be bent or flexed, and attached to the base 10 by suitable fastening structure. End attachment structure can be provided to secure free ends of the container wall to one another to close the perimeter of the container.

The container wall 12, in a preferred embodiment, is formed from a single elongated strip of material as shown in FIG. 2. This strip of material is attached at a long side edge 20 to the base 10 in an upright configuration. Appropriate fastening structure is provided on the container wall 12 for attachment to the base 10. This fastening structure is preferably a number of spaced-apart tabs 24 formed integrally with the container wall 12. The tabs 24 extend outwardly from the long side edge 20, and preferably in a substantially perpendicular relationship to the long dimension of the container wall 12. Slots 28 are provided in the base 10 and separated by distances commensurate with the spacing between the tabs 24. The slots 28 are positioned so as to create a desired configuration for the container wall 12, such as the circular embodiment shown in the drawings. The tabs 24 are inserted through the slots 28, and are then folded beneath the base 10 (FIG. 3) to secure the container wall 12 to the base 10. The number of tabs 24, as well as their dimension and shape, can be modified to suit a particular container design.

End attachment structure is provided to secure free ends 32, 34 of the container wall 12 together. This will substantially seal the container wall 12 and prevent the escape of flowable foods such as raw egg. Suitable end attachment structure includes oppositely-oriented channels 38, 40. The channels 38, 40 are inwardly directed from long side edges of the container wall 12 at the free ends 32, 34, respectively. The channels 38, 40 form respective interlocking tabs 44, 46 (FIGS. 1–2). The tabs 44, 46 will secure the free ends 32, 34 of the container wall 12 together to provide a substantially sealed container wall structure.

The base 10 and container wall 12 can initially be provided in a substantially planar card, which can be easily stored. Serrations, scribe cuts, or other suitable means can be used to separate the components of the container from the card. In a most preferred embodiment, two containers are provided in a single elongated card 50. The container walls 12 are provided at the long side edges of the card 50, with the tabs 24 protruding outwardly. Longitudinal serrations 54 are provided for separation of the container walls 12 from the card 50. A lateral serration 58 is provided to separate the bases 10 from one another. The channels 38, 40 can be pre-punched in the card 50. The container can thereby be conveniently packaged and stored, yet the components can be readily separated from the card 50 and connected together to form the completed food container. It would also be possible to provide alternative card constructions wherein more or fewer containers could be provided in each card, or containers having different configurations are provided.

The container of the invention can be constructed from a number of suitable materials. The material should be substantially rigid in order to provide a secure container for the food. The material should also be somewhat pliable, however, in order to permit the container wall 12 to be bent or flexed into the necessary configuration, and to permit the folding of the tabs 24 to secure the container wall 12 to the base 10. The material must also be safe to use in the microwave oven. The material should be substantially frangible where components are provided initially in the card 50, such that these components can be readily removed by breaking the card at serrations or scribe cuts. The material should also be non-toxic, and inexpensive to allow for disposal following use. The material will also preferably have non-stick properties to prevent attachment of the food to the container during cooking. Cardboard is a presently preferred material, and can be covered with a suitable non-stick coating 64 (FIG. 2), such as beeswax, to provide the desired non-stick properties.

This invention can be provided in alternative embodiments without departing from the spirit or essential attributes thereof, and accordingly, reference should be had to the following claims, rather than to the foregoing specification, as indicating the scope of the invention:

I claim:

1. An assembly for constructing a food container for microwave ovens, comprising:
   a base having spaced-apart slots;
   a container wall comprising an elongated strip having free ends and spaced-apart tabs at a long side edge of said elongated strip, said slots on said base being adapted to receive said tabs on said container wall strip, end attachment means being provided at said free ends of said container wall strip for securing said free ends together, whereby said tabs can be positioned through said slots and folded under said base to secure said container wall to said strip in an upstanding, substantially closed-perimeter configuration.

2. The assembly of claim 1, wherein said end attachment means comprises an interlocking tab at each of said free ends of said container wall strip, said interlocking tabs being adapted for cooperative engagement to one another to secure said free ends of said container wall to one another.

3. The assembly of claim 2, wherein said interlocking tabs are formed by channels at said free ends, said channels extending inwardly from opposing long side edges of said container wall strip, whereby said interlocking tabs so formed will be oppositely oriented, and will be adapted to engage one another to secure together said free ends of the container wall together.

4. The assembly of claim 1, wherein said base and said container will are fixed within a card, said card having means for separating said base and said container wall from said card.

5. The assembly of claim 4, wherein said separation means comprises serrations.

6. A card for constructing a food container for use in microwave ovens, comprising:
   separation means in said card defining at least one base and at least one container wall, said separation means being adapted for the separation of said base and said container wall from said card;
   said separation means for said container wall defining an elongated strip having free ends when removed from said card, and a plurality of spaced-apart tabs extending outwardly from a long side edge of said strip, end attachment means formed in said container wall strip further comprising end attachment means adapted to secure said free ends of said container wall together;

said base comprising slots adapted to receive said tabs of said container wall strip, whereby said tabs can be inserted through said slots to attach said container wall to said base.

7. The card of claim 6, wherein said end attachment means comprises interlocking tabs at each of said free ends.

8. The card of claim 7, wherein said interlocking tabs are formed by channels at each of said free ends, said channels extending inwardly from opposing long side edges of said container wall strip, whereby said interlocking tabs so formed will be oppositely oriented, and will be adapted to engage one another to secure together said free ends of the container wall.

9. The card of claim 8, wherein said card comprises at least two base portions and at least two container wall portions, said base portions being juxtaposed to provide an elongated card, said container wall portions being provided at the long side edges of said elongated card.

10. The card of claim 6, wherein said card comprises at least two base portions and two container wall portions, said base portions being juxtaposed in said card, and said container wall portions being provided at long side edges of said card.

11. The card of claim 6, wherein said card is cardboard with a non-stick coating, whereby food cooked in said container will not adhere to said portions of said container.

12. A method of constructing a food container for microwave ovens, comprising the steps of:

separating from a card a base portion and a container wall portion, said container wall portion comprising an elongated strip having free ends when removed from said card, and having a plurality of spaced-apart tabs extending outwardly from a long said edge of said strip, said base portion being provided with a plurality of slots corresponding in position to said tabs on said container wall portion;

placing said tabs of said container wall portion into said slots of said base portion, and attaching free ends of said container wall portion to one another to substantially seal the perimeter of said container, whereby said container wall portion will be engaged to said base portion in a substantially upright, closed-perimeter configuration, and whereby an open-topped container for food will be formed.

13. The method of claim 12, wherein said step of attaching ends of said container wall to one another comprises the interlocking of tabs at each of said free ends.

14. The method of claim 12, wherein said separation step comprises the breaking of serrations formed in said card, said serrations defining said base portion and said container wall portion.

* * * * *